United States Patent [19]

Sreenan

[11] Patent Number: 5,742,772
[45] Date of Patent: Apr. 21, 1998

[54] RESOURCE MANAGEMENT SYSTEM FOR A BROADBAND MULTIPOINT BRIDGE

[75] Inventor: Cormac J. Sreenan, Green Village, N.J.

[73] Assignee: Lucent Technologies Inc., Murray Hill, N.J.

[21] Appl. No.: 851,056

[22] Filed: May 5, 1997

Related U.S. Application Data

[63] Continuation of Ser. No. 560,446, Nov. 17, 1995, abandoned.

[51] Int. Cl.$^6$ .................................................. G06F 15/176
[52] U.S. Cl. ........................... 395/200.56; 395/200.7; 395/200.59; 370/17; 370/54; 370/85.13
[58] Field of Search ........................... 395/200.56, 200.7, 395/200.59; 370/85.13, 17, 54

[56] References Cited

U.S. PATENT DOCUMENTS

| | | | |
|---|---|---|---|
| 4,905,282 | 2/1990 | McGlynn et al. | 380/48 |
| 5,086,426 | 2/1992 | Tsukakoshi et al. | 370/85.13 |
| 5,131,016 | 7/1992 | Broughton et al. | 375/240 |
| 5,309,437 | 5/1994 | Perlman et al. | 370/85.13 |
| 5,341,477 | 8/1994 | Pitkins et al. | 395/200.09 |
| 5,426,637 | 6/1995 | Derby et al. | 370/85.13 |
| 5,461,611 | 10/1995 | Drake, Jr. et al. | 370/54 |
| 5,485,455 | 1/1996 | Dobbins et al. | 370/60 |
| 5,509,123 | 4/1996 | Dobbins et al. | 395/200.15 |
| 5,526,344 | 6/1996 | Diaz et al. | 370/16 |
| 5,530,695 | 6/1996 | Dighe et al. | 370/17 |

OTHER PUBLICATIONS

"Video conferencing, file storage, and management in multimedia computer systems", Rangan, P.V., *Computer Networks and ISDN Systems* 25, (1993) pp. 901–919.

"Panel–Discussion Multimedia Conferencing over ATM Network", Wakahara, T., and Unemoto, K., *IEEE Com. Soc. Int. Conf. On Multimedia Communications*, May 1994.

"Multipoint Multimedia Conferencing", Clark, W.J., *IEEE Communications Magazine*, May 1992, pp. 44–50.

"Issues of Reserving Resources in Advance", Wolf, L.C., et al., 5th Int. Workshop on Network and Op. Sys. Support For Digital Audio & Video, Apr. 1995.

"A Standards–Based Multimedia Conferencing Bridge", Horn, D.N., et al., *AT&T Technical Journal*, Jan./Feb. 1993, pp. 41–49.

"A Versatile Audio Bridge for Multimedia Conferencing", Horn, D.N. and Sharma, A., *Proc. of IEEE ICC '94*, pp. 1754–1762.

"Montage: Continuous Presence Teleconferencing Utilizing Compressed Domain Video Bridging", Gaglianello, R.D., and Cash, G.L., *Proc. of IEEE ICC '95*, pp. 573–581.

*Primary Examiner*—Robert B. Harrell
*Assistant Examiner*—Saleh Najjar

[57] ABSTRACT

An electronic bridge resource management system, having a programmatically-implemented processing system. A bridge service interfaces with a plurality of clients and receives a quality of service (QOS) specification from each of the clients. A resource manager receives a QOS specification from the bridge service, distributes at least one QOS constraint associated with the QOS specification across flow processing modules of a channel, determines resource requirements for each of the flow processing modules, and then determines whether bridge resources can be allocated to meet the QOS specification. The clients may alter their QOS specifications and retry if the resource manager denies them admission because of a lack of available bridge resources.

20 Claims, 5 Drawing Sheets

RESOURCE MANAGEMENT SYSTEM FOR A BROADBAND MULTIPOINT BRIDGE

This is a continuation of application Ser. No. 08/560,446, filed on Nov. 17, 1995, now abandoned.

FIELD OF THE INVENTION

The present invention relates to a system for efficiently allocating broadband bridge resources. In particular, the system allows client applications to negotiate quality of service contracts with a bridge resource manager.

BACKGROUND OF THE INVENTION

As the deployment of high-speed networking accelerates to reach homes and offices, the popularity of multi-user applications is expected to increase dramatically. Examples of these applications include conferencing, game playing, collaborative working and distance learning. Multi-user applications usually involve different information types, such as control data, video, images and audio, which are exchanged between the various user terminals, i.e., they are multipoint. Designing a system to support these multi-media multipoint applications presents two key challenges: a scalable technique for managing potentially complex interactions, and the use of resources in an efficient and economical fashion. In the Narrowband-ISDN context, these issues are addressed for multi-user conference calls by using a bridge, also known as a multipoint control unit (MCU). A bridge is a logically centralized service that performs data combination and conference management, e.g., adding/dropping users. It accepts audio from each of the users, mixes the signals and transmits the resulting signal in return, thereby enabling multipoint communication over point-to-point links.

In a packet based network like Broadband-ISDN, it is of course possible to provide these bridge functions in a distributed manner at sophisticated terminals, e.g., personal computers (PCs) and workstations. However, there are cogent arguments for the use of a bridge in this scenario also. Simple terminals will continue to be attached to the network and may not be capable of supporting these functions. Directly attached ATM devices, as well as telephones, fall in this category. By providing a logically centralized focus of control, many of the management issues are simplified, notably with respect to maintaining accurate state information and providing secure access. Regarding the use of bandwidth, a bridge-based solution can be highly efficient, avoiding any unnecessary data transmission. For example, one doesn't need to receive individual (bandwidth intensive) audio and video channels from each user.

Designing a broadband bridge is considerably more complex than for the narrowband network and raises several issues which must be addressed in order to make this approach viable. The focus of the present invention is on how to efficiently manage bridge resources, an issue which is motivated by the following four considerations. Firstly, the range of applications is much wider, demanding a greater flexibility in terms of bridge functions and the resources they demand. Secondly, the capabilities of terminals will vary, as will the types of compression and data channel processing that they support. Thirdly, use of a packet network in combination with variable bit rate traffic such as compressed video, introduces issues of bridge resource management akin to those for the network itself. Fourthly, operation of the bridge can have serious consequences for the end to end Quality of Service (QOS) received by audio and video channels, notably in regard to delay and packet loss.

SUMMARY OF THE INVENTION

A bridge provides a set of services to enable efficient operation of multipoint applications. In a broadband context, the task of designing a multipoint bridge is complicated by several factors, including different media types, asynchronous (packet) communications, and heterogeneous terminals. The present invention is directed to resource management within a broadband multipoint bridge.

According to one aspect of the invention, an electronic bridge resource management system comprises a programmatically-implemented processing system having bridge service and resource manager software. The bridge service interfaces with a plurality of clients and receives a quality of service (QOS) specification from each of the clients. The resource manager receives the QOS specification from the bridge service and distributes at least one QOS constraint associated with said QOS specification across the flow processing modules of a channel. The resource manager then determines the resource requirements for each of the flow processing modules, and determines whether bridge resources can be allocated to meet the QOS specification. As part of the QOS contract negotiation process, the clients may alter their QOS specifications and retry if the resource manager denies them admission because of a lack of available resources.

According to a second aspect of the invention, a method is provided for implementing a bridge degradation policy where a client passes service degradation policy information to the bridge. The degradation policy information relates to a prioritization amongst either clients, channels, or groups. The bridge then stores data corresponding to the degradation policy information in the appropriate client, channel or group data structure. The bridge implements the specified degradation policy should a bridge resource overload occur.

DESCRIPTION OF THE DRAWINGS

The invention will be described in greater detail below with reference to the attached drawings, of which.

DESCRIPTION OF THE PREFERRED EMBODIMENT

In the following description of the preferred embodiment, a "group" refers to a collection of clients that participate in a multi-user application. For each group that the bridge is asked to create, it maintains a data structure.

A client is a software program that runs at a multimedia terminal and interacts with the bridge service to allow a user to take part in a group. In order to participate in a particular multi-user application, a user is expected to select and run the corresponding client program. For example, a user could participate in a multi-player game and a multi-user conference by running both the game and conference clients. Client information is recorded in a bridge-maintained data structure.

Associated with a group are one or more channels, where each channel allows communication of a specific information type between the clients in the group. Examples of information types are audio, video and whiteboard data. A channel is represented by a bridge-maintained data structure and realized using a set of dedicated flow processing modules (FPMs) and connecting flows (described in detail later). For an audio conference with three clients, for example, the channel consists of a pair of flows for I/O to each client and an audio mixing FPM at the bridge.

Each user participates in a group by interacting with a bridge using his/her terminal, typically via a graphical user interface (GUI). Terminals may take many forms, including PCs and set-top boxes, and are equipped with broadband network access and some I/O devices, such as a display, speaker, microphone and/or a camera. Application software, running on the terminal or its agent (e.g., a PC controlling access to a telephone) uses a signalling protocol such as remote procedure call (RPC) to interact with the bridge service.

The bridge service is software running on the bridge to implement the application programmer's interface (API) to the services provided by the bridge. A bridge is designed to allow simultaneous access by multiple groups. The broadband network is used to transport control information (i.e., signalling) and data traffic over virtual circuits between the bridge and terminals. Data traffic includes continuous media (CM) such as audio and video, which may be used depending on particular application requirements, user preferences and terminal capabilities.

Figure 1:
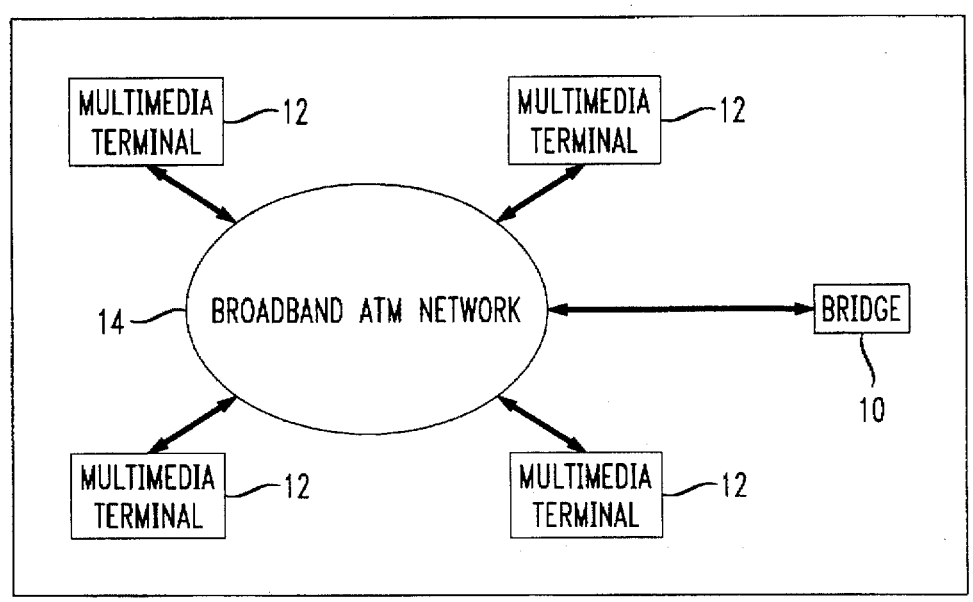
FIG. 1 is a diagram showing a typical bridge system configuration.
Figure 2:
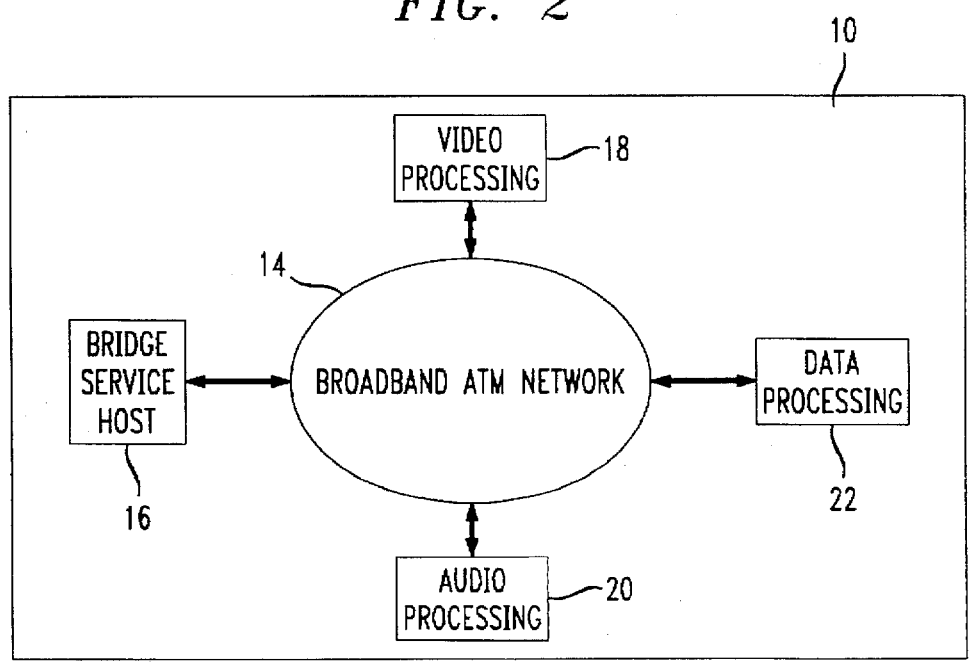
FIG. 2 is a diagram showing an example of a distributed bridge.

FIG. 1 shows a typical system configuration where a bridge 10 and various multimedia terminals 12 are interconnected by a broadband ATM network 14. A bridge is a computer system designed to handle large internal and external data bandwidth, such as available on modern class server machines (e.g., Silicon Graphics Inc. Challenge servers). A network service provider may implement a bridge server as a switch adjunct in an intelligent network. The bridge 10 may be physically realized using a collection of networked hosts, offering perhaps, media-specific facilities such as video processing. Such a distributed bridge arrangement is illustrated in FIG. 2 where a bridge service host 16, a video processing host 18, an audio processing host 20, and a data processing host 22 are interconnected by the broadband network 14 itself. Moreover, the concepts of the present invention could also be supported by multiple cooperating bridges.

The bridge service API allows user applications (clients) to access the facilities of a bridge 10. When a request is received by the bridge service it is processed and a reply is returned to the client, indicating success or failure. As part of processing each request the bridge service may initialize or modify state information which it maintains to record information about groups and clients. The interface to the bridge 10 is defined by the API and associated state information. The interface might also support multi-level groups (e.g., to allow sub-conferences).

As already defined, a group refers to a collection of clients that participate in a multi-user application involving a bridge 10. For each group, the bridge service maintains a data structure as part of its state information. It also maintains per-client information, with a distinct client data structure for each group in which a user participates. These data structures maintained by the bridge, and their constituent fields, are as follows:

Group Data Structure
1. group identifier
2. list of current clients (i.e., the participants)
3. group owner (the creator by default)
4. current status (e.g., starting, ongoing, paused, future reservation)
5. schedule (start time/date, duration)
6. floor control policy (e.g., open, selected client coordinates, bridge coordinates requests sequentially)
7. access control policy (e.g., open, restricted client list)
8. setup mode (active-bridge initiated, passive)
9. billing (e.g., owner, equal client shares, usage-based)
10. media channels (number and type, e.g., video, audio, whiteboard)

Client Data Structure
1. client identifier
2. user details (name, address)
3. client address
4. authentication key (cryptographic key)
5. current group (can be null)
6. current status (active/inactive)
7. event reporting (on/off, event mask)
8. acceptable data formats (compression, coding)
9. available media devices (types, capabilities)
10. list of current channels
11. media channel mask
12. presentation options (e.g., window quadrants, audio-based selection)

Several parameterized calls are provided as part of the API, including those to: (1) create and destroy a group; (2) create and destroy a client; (3) allow a client to join or leave a group; and (4) set or get attributes of a group or client.

Figure 3:
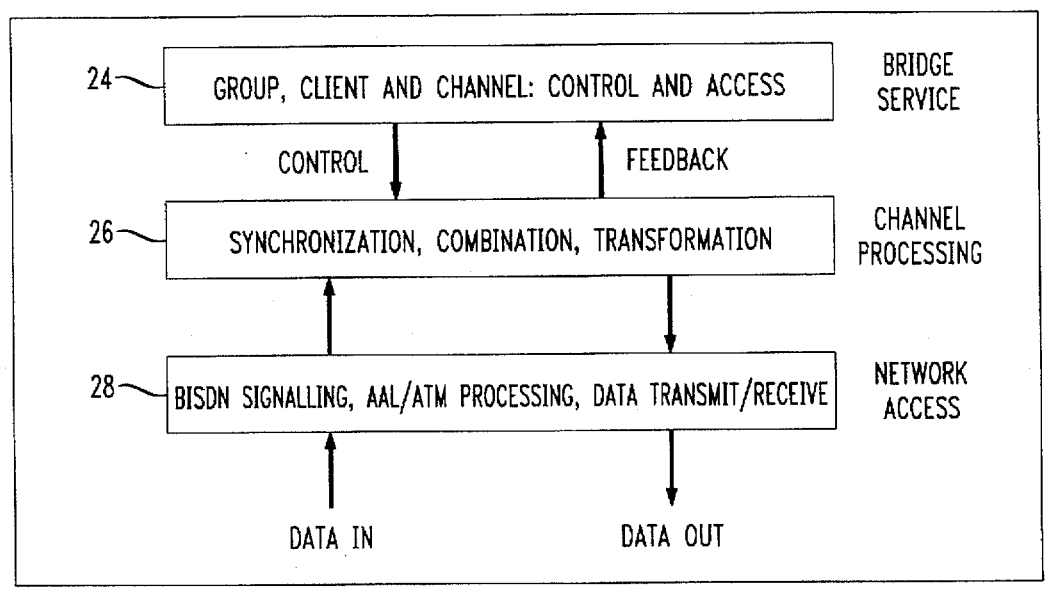
FIG. 3 is a functional block diagram illustrating the overall bridge architecture.

As illustrated in FIG. 3, the bridge architecture comprises three basic elements: the bridge service 24, channel processing 26, and network access 28. The bridge service 24 implements the API and grants bridge access to clients, groups and channels. Some of the channels being used in a group may require processing by the bridge 10 (the channel processing function 26 in the present invention is performed by the FPMs). In particular, CM may be operated on to perform synchronization, combination and/or transformation. Synchronization is essential so that temporal relationships between CM can be maintained. Combination refers to functions which can be applied to a set of CM, e.g., individual gain controls for audio, and image scaling for video. The need for transformation arises due to the use of heterogeneous data formats and device capabilities. For example, one multimedia terminal might have an MPEG compression board while the other participant has only JPEG support. The bridge must also access the broadband network 14 in order to receive and transmit control and data (including CM), and execute the appropriate communications protocols. For example, the network access function 28 of the bridge supports BISDN signalling, AAL/ATM processing, and data transmit/receive.

An important requirement in operating a bridge 10 is performance. In other words, how to give clients access to a group with a level of performance that is acceptable and predictable. This in turn demands an appropriately designed resource management system. In the narrowband case this is drastically simplified by the fact that the maximum bandwidth is low, even for CM, and the current usage easily determined by the number of active physical network connections. In addition, the set of processing functions is usually quite limited and statically defined, allowing implementation using a bank of DSPs. For a broadband bridge, however, the set of processing functions will be larger and will need to be capable of being dynamically updated, e.g., to accommodate a new video compression format. This places an increased emphasis on software implementations. Furthermore, the maximum bandwidth will be significant and, more importantly, may vary even for a given CM channel, making it more difficult to determine current usage requirements. The present invention therefore provides an efficient technique for managing access to bridge resources.

In essence, a bridge 10 is a server in a large distributed computing system. The conventional way of dealing with resource management in such systems is to rely on an operating system to control resource access by a collection of user-level entities, often called processes or domains. This allows the processes to operate independently but share a common platform. For a broadband bridge, this could take the form of a bridge service that instantiates a process to deal with each new group. That process would then deal with its client's requests, and perform channel processing and distribution. Each process would make requests to the operating system in order to access resources, such as CPUs, DSPs, memory and network I/O. While this is a reasonable model, it makes it difficult to allocate resources in a manner which is both efficient and can ensure predictable scheduling. For a broadband bridge, a finer degree of resource management is desirable. This is important in order to support the Quality of Service (QOS) requirements of CM channels, which typically have stated delay, jitter and loss tolerances.

In general terms, a QOS contract is an agreement with a resource provider for use of that resource to satisfy a specific performance requirement. QOS defines the expected performance for data transport on a flow. It is specified as a set of parameters describing the type of QOS contract, traffic and performance. Broadband networks are designed to support QOS contracts on an end to end basis. In the system of the present invention, these contracts are extended to encompass bridge operation.

An architecture for QOS has a set of basic functions: specification, negotiation, translation, admission control, policing and scheduling. User specifications describe traffic characteristics (e.g., mean/peak bandwidth, burstiness), performance requirements (e.g., delay, jitter, losses), and type of QOS contract (e.g., guaranteed, statistical). In order to try to ensure that these QOS requirements can be attained, a user must negotiate with a QOS manager. This entails passing the specification information and waiting to see if access will be granted or denied. The specification is translated by the QOS manager to a set of resource demands, e.g., amount of memory and CPU cycles, and used in combination with knowledge of already existing applications to perform an admission control test. The result determines whether a QOS contract can be established for use of the system as requested. If a contract is granted, a policing mechanism aims to ensure that the stated source traffic limits are upheld, while the scheduling mechanism aims to try and meet performance requirements.

In order to allow QOS-driven resource management for a broadband bridge 10, the system of the present invention allows clients to establish contracts for bridge access in a similar manner as they do for network access. Furthermore, rather than simply allocating resources based on number of groups, clients or channels, higher efficiency is achieved by associating resources with channel processing activities. Such resource allocation is enabled by introducing the concepts of "flows" and "flow processing modules".

Recall that a group may involve several channels, some of which may carry CM. Each client will contribute to, and receive, some or all of the channels in its group. Thus, for a given channel, the bridge 10 will be receiving data from clients, operating on it, and returning the resulting data. An example is a group which has a single channel over which each client transmits its audio and receives the combined signal in return.

A "flow" is the connection for carrying data from/to a client and the connection for carrying data internally between the channel processing stages 26 of the bridge 10. Each channel comprises a set of flows. A flow is always associated with a particular channel within a group, but not necessarily a single client of that group. Essentially, a flow is a unidirectional pipe for data transport between ports that is implemented using a network virtual circuit (VC) or internally to the bridge 10, by using bridge memory buffers.

The various functions 26 that can be applied to a channel are realized using flow processing modules (FPMs), which could be implemented as functions in a programming language library. Each one of these implement a single well defined function and execute at run time as independently schedulable threads. A thread is a software program that exists to execute an FPM instance or process a flow within a client. Thus, once a given FPM is selected, an instance of that FPM is created and assigned to a thread for execution.

Each FPM is designed to receive data for a particular channel on one or more input flows, process it to perform a self-contained function, and then transmit the resulting data on its output flow(s). A simple example of a FPM is one which is responsible for receiving flow data from an incoming network VC. More sophisticated examples include FPMs for combining audio and performing video format conversions. As part of its definition, a FPM may accept parameters which tailor its behavior. For example, a JPEG video compression FPM would accept a quantization factor.

Each FPM performs software initialization and core processing. Once an instance of an FPM is created, it performs initialization which involves interpreting control parameters, setting up data structures, etc. The FPM instance then enters a loop where its core processing takes place. In particular, this is a loop in which the FPM reads data from its input flow(s), processes it and writes the results to its output flow(s). Core processing may be implemented in different ways independent of the FPM's functional definition. For example, an audio combination FPM may be executed on a CPU or using a DSP. Traditionally DSPs have been used to support audio and image manipulation, but with faster processor speeds and suitably designed compression techniques it is possible to implement many such features in software (e.g., a video mixer) thereby facilitating the incremental addition of new bridge functions.

Software allocates bridge resources to each FPM instance admitted for execution. Such allocations are an important aspect of the present system. It is by controlling how each thread accesses the bridge resources that QOS contracts can be honored.

Figure 4:
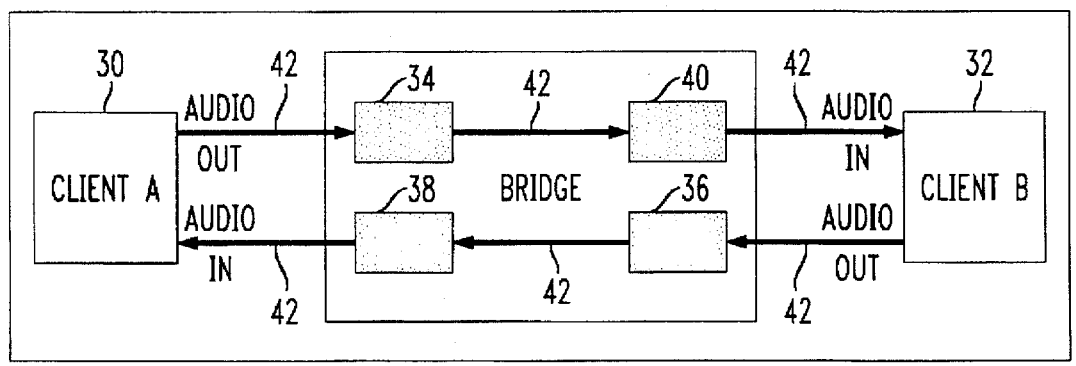
FIG. 4 is a diagram illustrating the basic FPMs and flows for a single (audio) channel, two client conference.

FIG. 4 shows the use of FPMs to implement a two client conference with just a single (audio) channel, where client A 30 and client B 32 communicate via the bridge 10. Two FPMs 34, 36 are used for receiving audio information and two FPMs 38, 40 are used for transmitting audio information. Flows 42 carry data to/from the bridge and interconnect the FPMs for a given channel. Data is processed in a pipeline, arriving from the network and traveling on flows through a sequence of FPMs.

Figure 5:
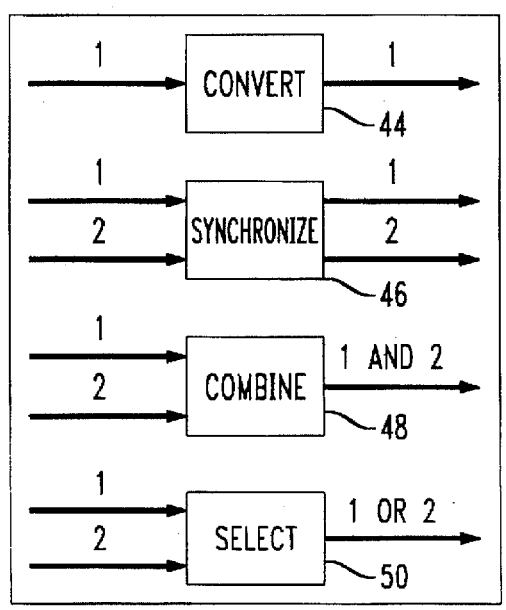
FIG. 5 is a diagram showing several examples of multi-port FPMs.

FPMs are allowed to have more than one input and output port. A port is an end-point for communication over a flow. It is associated with a particular thread, running on either the bridge or a multimedia terminal. FIG. 5 shows four examples of multiport FPMs: a Convert FPM 44 having a single input and output port; a Synchronize FPM 46 having two input ports and two output ports; a combine FPM 48 having two input ports and a single output port; and a select FPM 50 having two input ports and a single output port. Each FPM also has control and feedback ports for interacting with the bridge service (not shown).

The FPM/flow model requires extensions to the bridge service API and state information as previously presented. Data structures for a channel, flow and FPM/Thread are as follows:

Channel Data Structure
1. channel identifier
2. channel type (e.g., audio, video, data, animation, etc.)
3. owner (e.g., group identifier)
4. list of flows (flow identifiers)
5. list of FPMs (module identifiers)

Flow Data Structure
1. flow identifier
2. owner (default is group)
3. source (host/thread/port)
4. sink (host/thread/port)
5. network VC information (e.g., ATM address, unicast or multicast VC)
6. QOS (contract type, traffic and performance)

FPM/Thread Data Structure
1. module identifier
2. owner (default is group)
3. control/event ports
4. list of input ports
5. list of output ports
6. operating parameters
7. resource handles (a "ticket" allowing access to allocated bridge resources)

Access to the above items is achieved by extending the API with the following parameterized calls: (1) create and destroy a channel; (2) join and leave a channel; and (3) set and get channel attributes.

The FPM/flow model aims to simplify the process of translating a client's requirements for service quality and bridge functions in terms of actual resource needs. As mentioned, resources are allocated so that a thread can execute an instance of an FPM. In the bridge, these resources (represented in FIG. 6) are memory 52, DSPs 54, CPUs 56, internal and external bus/network access 58. Other resources used to transport or process data may also be allocated, e.g., switches.

Figure 6:
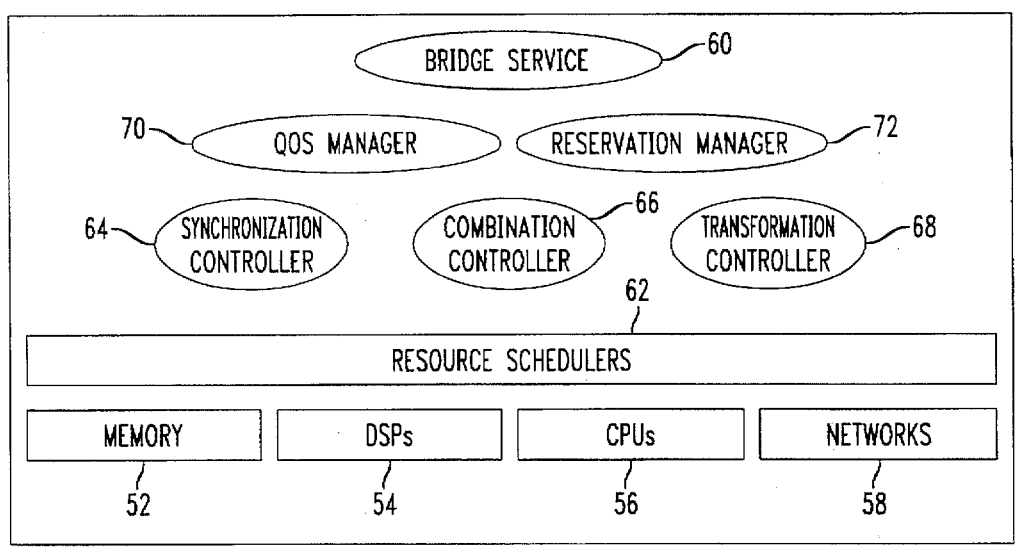
FIG. 6 is a diagram illustrating the components of the bridge software architecture for QOS management.

FIG. 6 shows the components of the software architecture needed for resource management within a bridge. Access to the bridge is by way of the Bridge Service 60, which passes requests on to the resource management system. There are three levels of resource management, the lowest being the individual resource schedulers 62, which allow access to resources by those FPMs admitted for execution. A resource scheduler selects from amongst waiting FPMs according to a scheduling policy. In order to allow performance constraints to be satisfied, a scheduling algorithm of the type used in fast packet switches is employed, i.e., support for priority and time deadlines. At the middle level are three controllers, defined for synchronization 64, combination 66, and transformation 68 FPMs, one for each of the three types of processing that the bridge implements. These keep track of the available FPMs and can estimate their resource requirements for a given parameter and traffic set. At the top level is the QOS Manager 70. This can be viewed as a higher-level scheduler which performs admission control and coordinates resource access. A resource handle is an identifier issued by the QOS Manager 70 for use by an FPM to gain access to a particular resource. This is achieved by presenting the handle to the appropriate resource scheduler 62. At the same level as the QOS Manager 70 is the Reservation Manager 72, which allows longer term management by handling advance reservation of bridge resources.

Figure 7:
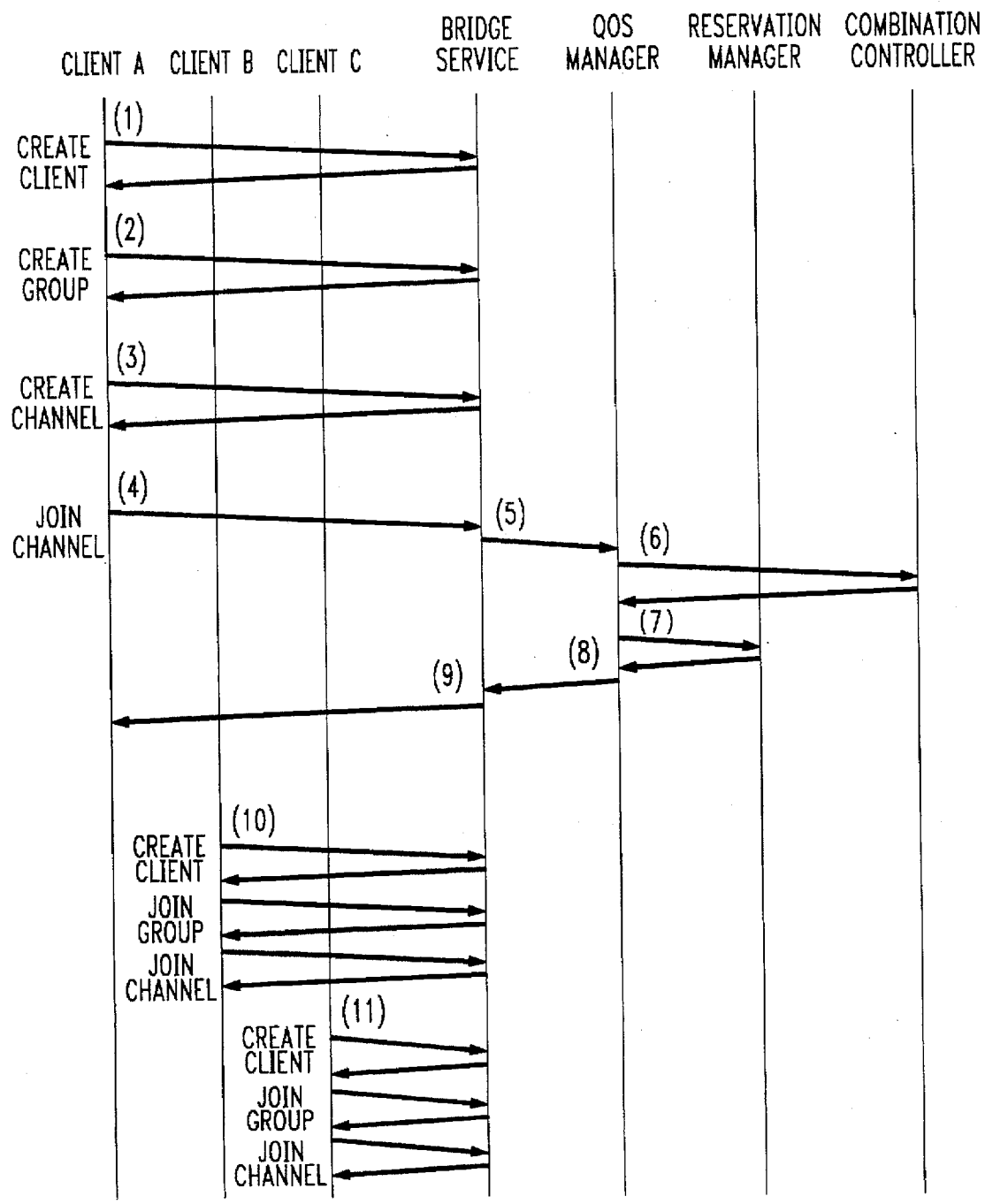
FIG. 7 is a chart illustrating interactions between clients and bridge for forming a three client audio conference.

In order to explain the detailed interactions of the three levels of resource management, an example will be used. A three client audio-only conference and the various interactions necessary to realize it is shown in FIG. 7. The owner makes a request (1) to the Bridge Service 60 to create a client which we call Client A, and subsequently to create a group (2) that will have a total of three clients, a single audio channel, and which is to start immediately. The bridge service 60 allocates and initializes client and group data structures, returning an indication of success to Client A. Client A then requests (3) that the channel be created, and that a FPM for audio combination should be associated with it. If successful, the channel data structure and a FPM data structure (for the audio combination FPM) are created by the bridge service. Client A then requests (4) to join that channel, supplying the QOS parameters (i.e., the QOS specification) it expects for the flow to be received from the bridge.

It is at this point that the Bridge Service 60 calls (5) on the QOS Manager 70 to decide whether the client should be admitted for execution. Admission control involves three basic steps: constraint distribution, resource translation, and admission decision. Constraint distribution involves a software algorithm for decomposing the overall QOS constraints (as given in the specification) in terms of operating constraints for the individual threads which are executing FPMs for that channel. Various approaches can be used for implementing constraint distribution. One approach is to simply distribute the constraints equally. A more sophisticated approach corresponds to a two phase protocol used for virtual circuit establishment in some wide area ATM networks. In the first phase the network QOS specification is passed sequentially through each switch between the source and sink, aiming to satisfy the overall constraint at each switch. The second phase proceeds in the reverse direction and attempts to optimize the constraint distribution. A result of such an approach is that, for example, a heavily loaded switch can be given the freedom to introduce a larger delay than others which may be more lightly loaded.

After constraint distribution, the translation feature is implemented to determine the resource requirements of the FPMs for the specified constraint distribution. Translation is the act of determining approximate resource requirements for each thread so that it can meet its assigned QOS constraints. In the present example, the QOS Manager 70 calls (6) on the combination controller 66 to assess what type and quantity of resources are required for the FPM based on the QOS requirements of Client A's audio. It then uses this in combination with the resource requirements for the receive and transmit FPMs to reach an initial admission decision. If insufficient resources are available, then the QOS Manager 70 tries a different constraint distribution and repeats the translation step. If there are sufficient resources the QOS Manager 70 checks (7) with the Reservation Manager 72 to ensure that the resources it is about to allocate aren't already reserved. If they are in fact available for immediate use, the resources are allocated and marked in the QOS Manager's state tables as allocated.

The QOS Manager 70 then instantiates the combination, receive, and transmit FPMs and updates the channel data structure. (The receive and transmit FPMs are automatically created when a client joins a channel. Similarly, any transformations required will automatically result in a transformation FPM being created and executed based on the client's capabilities as determined from the client data structure.) The interconnecting flows are then created as follows: (a) the QOS Manager 70 sends a control message to the audio combination FPM requesting its desired input port number; (b) when this information is received, the QOS Manager 70 sends a control message to the receive FPM (via its control port) specifying the thread identifier and port number of the audio combination FPM to which it should send data; (c) the receive FPM also reports its output port number; (d) the QOS Manager 70 can now initialize a Flow data structure because it has the thread and port information for the flow's source and sink. In a similar manner, the QOS Manager 70 interacts with the transmit FPM and then the audio combination FPM to derive the relevant port information and initialize the data structure for the interconnecting flow.

In performing the preceding steps, flow and FPM/Thread data structures are created and initialized. The QOS field in each flow data structure is filled in depending on the constraint decomposition decided upon by the QOS Manager 70 during constraint distribution. In particular, the constraints assigned to each thread determine the corresponding QOS parameters that are stored as part of each flow data structure. Combining QOS fields in all the flows of a particular channel should equal the overall QOS specification provided by the client. Note that the FPM data structure includes the handle of the specific resource(s) which have been allocated to it, and such resource(s) include the flow resources (VC or buffers) connected to its output ports.

A reply (8) is then sent to the Bridge Service 60 which in turn gives to the client (9) details of the bridge port (of the receive thread) to which it should open a VC for the audio data, and the QOS parameters it should request from the network for that VC (for setting up network contracts).

In a similar manner, both Client B (10) and Client C (11) also make requests to create clients, join the group and channel. In response to the request to join the channel, the QOS Manager 70 performs an admission control test using the client's QOS parameters (these are provided to the bridge for each channel that a client wishes to join) and the expected increase in the FPM's resource needs. As each client joins a channel the bridge also arranges its network transport (i.e., creating a VC for flow data) to that client over a unicast or multicast VC. Note that the QOS Manager 70 uses the control port on the combination FPM to arrange for it to handle an additional flow of audio. Any subsequent requests to modify attributes which may affect resource usage are also passed by the Bridge Service 60 to the QOS Manager 70 for evaluation. Should a request be denied because of a lack of available resources, a client may alter its request and retry.

Once a client is admitted to join a channel, data will flow between threads requiring that the threads execute in order to process the data. Resource schedulers 62 select from amongst those threads that are ready to execute (at any point in time a resource scheduler has a queue of threads eligible to execute). The resource scheduler 62 selects the thread to execute next based on some policy and after examining the resource handles belonging to the waiting threads. Such a policy, for example, might be preemptive time-sharing or earliest deadline first. Finally, in the case for example of an allocated CPU resource, the resource scheduler 62 loads the thread state into the CPU's registers and then starts it executing.

Advance Reservations

The basic QOS model corresponds to that used in the ATM networking area. A characteristic of that model is that a QOS contract is negotiated for immediate access to resources and for an unspecified length of time, equivalent to making a telephone call. For many of the applications that a bridge supports, notably conferencing, this model is not always appropriate. Use of such applications has a parallel with real scenarios, where for example, it is common to schedule a meeting in advance. The ability to make an advance reservation for use of a bridge 10 is a feature implemented by the Reservation Manager 72 depicted in FIG. 6.

In order to make an advance reservation, two parameters are needed: start time and duration. The start time indicates either an immediate start (the default) or some future occasion. A duration defines the maximum time length and is necessary for both immediate and future requests so that the bridge 10 can capitalize on resource sharing and utilization. Note however that both of these parameters can be renegotiated, analogous to changing the meeting time or extending its length if the room is available. These parameters were described as part of the group data structure and are passed as part of the call to create the group. A key issue here is figuring out how much resources will be needed, as this is normally done as each client joins a channel. The accuracy of this process depends on how much detail the reserver can provide. The Reservation Manager 72 uses that information to derive an estimate. As a minimum the reserver is expected to indicate the number of clients which are expected to participate in the group and the channels to be used. This allows for the use of transmit and receive FPMs as well as interconnecting flows. If the reserver indicates additional FPMs then the estimate can be improved.

In terms of the resource management architecture a set of interactions are involved. When the Bridge Service 60 receives a request with a future start time specified it makes a request to the Reservation Manager 72. The Reservation Manager 72 operates by building up a resource request based on the information provided by the reserver. It consults with the FPM controllers 64, 66, 68 to provide resource estimates, and then checks with the QOS Manager 70 to determine any overlap with current allocations. At this point, a reply is sent to the reserver indicating whether the necessary resources will be available. If the reserver subsequently provides additional information such as specific FPMs, this internal negotiation process is repeated. Note that when the start time for a group arrives, responsibility for it is transferred from the Reservation Manager 72 to the QOS Manager 70.

High-Level Features

In the present invention, each user can associate QOS requirements with data being presented at his/her terminal.

These requirements cover both the temporal and informational properties of CM. For video, informational properties include: (1) number of images per second; (2) image dimensions, including pixel depth; (3) image quality, including (a) quantization factor; (b) movement threshold; (c) ratio of intra to inter coded images; and (4) loss measure. Similar informational properties can be defined for audio. Temporal properties are delay and jitter.

A user might set these variables in a static fashion or have the ability to dynamically alter them during presentation. Depending on the interface, access to these variables might be quite explicit, but is more likely controlled via one or two overall quality measures for the channel. This could take the form of a graphical slider or perhaps a choice of high, medium and low qualities. This creates a distinction between application and system level QOS specifications. System level specifications are what the bridge and network understand, e.g., bandwidth, delay, etc. Application level specifications, on the other hand, must be translated by the client application software to the system level representation.

The system of the present invention is sink-driven in the sense that the user is empowered to influence the desired QOS for its incoming channels. This approach allows considerable flexibility, relying on the bridge service API to make changes to channel attributes (data structure parameters, e.g., QOS). Client requests indicate a desire to alter activities at the bridge 10 and they may be denied because of a lack of resources. Each client of the bridge service 60 is required to maintain a callback interface. This is used to inform the client of events (e.g., new client joining) and errors. It is also used to request that the client change its resource usage, for example, by using less bandwidth. This is important because QOS-driven systems rely on statistical multiplexing for efficient resource sharing, and consequently there may be occasional periods of resource overload. Such is particularly the case when dealing with the potentially large bandwidth range of variable bit rate video.

QOS requirements which exist at a higher level than those of individual channels are also supported. In particular, it is useful to be able to reason about QOS at each of the independent levels: channel, client and group. The present invention supports the ability to deal with resource allocation and overload in terms of these levels. Using the API to set attributes, an authorized client is allowed to set resource limits and install simple policies for dealing with contention. Resource limits, cost limits, degradation policies, etc. are controlled by parameters stored in various additional fields of the associated client, group, or channel data structure. As with all parameters, they may be passed along with the call to create a client, group, or channel. Alternatively, they may later be passed using the set attribute call.

In general, degradation policies may be set by clients or the bridge operator, and are implemented by software in the QOS Manager 70. For example, priorities can be assigned to channels so that, for example, a client could specify that video should be degraded in preference to audio. Similar policies can be provided at the group level. For example, managerial group conferences can be assigned a higher priority than those groups running game software. Also, price related information might be used when setting degradation priorities, e.g., the lowest priced service is the most likely to be degraded.

Relationships between entities (e.g., channels) at the same level may also be specified in terms of QOS, for example, the degree of interchannel synchronization (i.e., lip synching). Coarser grain resource allocation is also supported so that, for example, the bridge operator could specify that fifty percent of the bridge resources may be allocated to a particular group.

The bridge also keeps track of accounting (e.g., how much of the CPU is group A using?) and pricing information. These functions may support several of the above-mentioned high-level features.

The FPM/flow model of the present invention could also be adapted to provide QOS support on a multimedia terminal 12. Such a feature would allow a client to negotiate for the multimedia terminal resources and establish a QOS contract with the multimedia terminal 12. FPMs provided by the terminal 12 might include data capture (e.g., video capture by a camera and audio capture by a microphone) and data presentation (e.g., video display by a CRT and audio display by a speaker), and data compression/decompression (this function could alternatively be performed by the bridge 10). In a similar manner, the present invention could be adapted to support QOS in other types of network-based servers (e.g., video-on-demand servers).

To those skilled in the art to which the present invention pertains, many changes in construction and variant embodiments will be suggested without departure from the spirit and scope of the present invention.

I claim:

1. An electronic multipoint bridge resource management system, comprising:

a programmatically-implemented processing system having:

a multipoint bridge service that interfaces with a plurality of clients and maintains record information about a group of said clients participating in a multi-user application, where said bridge service receives a quality of service (QOS) specification from each of said clients; and a resource manager that receives said QOS specification from said bridge service, distributes at least one QOS constraint associated with said QOS specification across flow processing modules of a channel, determines resource requirements for each of said flow processing modules, and determines whether bridge resources can be allocated to meet said QOS specification;

wherein said clients may alter their QOS specifications and retry if said resource manager denies them admission because of a lack of available bridge resources;

wherein said flow processing modules perform application-level functions including audio and/or video combination, synchronization or transformation, and where said flow processing modules are interconnected by flows for data transport; and wherein said resource requirements include memory, CPUs or DSPs.

2. The system of claim 1, wherein said client is a program running at a multimedia terminal.

3. The system of claim 1, wherein said processing system is implemented on a single host.

4. The system of claim 1, wherein said processing system is implemented on a plurality of distributed hosts.

5. The system of claim 1, wherein said processing system maintains group, client, channel, FPM/thread, and flow data structures.

6. The system of claim 5, wherein said FPM/thread data structure includes a list of resource handles, where said resource handles entitle the associated flow processing module to specific bridge resources.

7. The system of claim 1, wherein said QOS specification includes parameters indicating type of contract, traffic, and performance.

8. A method for managing computer system resources, comprising the steps of:

passing a quality of service (QOS) specification to a computer system;

said computer system associating estimated computer system resources to application-level channel processing activities based upon constraints derived from said QOS specification;

said computer systems granting or denying admission to computer systems resources depending on availability of said computer systems resources; and altering said QOS specification and retrying if admission is denied;

wherein said channel processing activities include audio and/or video combination, synchronization or transformation and;

wherein said computer system resources include memory, CPUs or DSPs.

9. The method of claim 8, wherein said computer system is a server.

10. The method of claim 9, wherein said server is a bridge.

11. The method of claim 10, wherein the step of passing a quality of service (QOS) specification includes the substeps of:

a user specifying a high-level application QOS specification; and translating said application QOS specification to a low-level system QOS specification.

12. The method of claim 10, wherein the step of associating estimated bridge resources to channel processing activities includes the substeps of:

performing QOS constraint distribution across a set of flow processing modules associated with said channel processing activities; and determining resource requirements for each flow processing module.

13. The method of claim 10, further comprising the steps of:

instantiating flow processing modules and assigning said flow processing modules to threads for execution.

14. The method of claim 13, further comprising the step of:

after a client is admitted to join a channel, a resource scheduler selecting a thread for execution from amongst a queue of said threads according to a scheduling policy.

15. The method of claim 10, further comprising the steps of:

a reserver passing to said bridge a create group request specifying a future start time and future requirements of said group;

translating said request to resource estimates;

checking to determine any overlap with current resource allocations;

sending a reply to said reserver indicating whether the necessary resources will be available.

16. The method of claim 10, wherein the step of granting or denying admission further includes the step of determining whether client specified resource limits would be exceeded.

17. The method of claim 8, wherein said computer system is a terminal.

18. A Method for implementing a bridge degradation policy, comprising the steps of:

a client passing service degradation policy information to a bridge, where said degradation policy information relates to a prioritization amongst clients, channels, and groups;

said bridge storing data corresponding to said degradation policy information in a client, channel or group data structure; and said bridge implementing said degradation policy should a bridge resource overload occur;

wherein bridge resources are allocated to execute flow processing modules which perform audio and/or video combination, synchronization or transformation as part of channel processing; and wherein said bridge resource overload occurs when there are insufficient resources to satisfy flow processing module requirements.

19. The method of claim 18, wherein said degradation policy specifies that a video channel should be degraded in preference to an audio channel.

20. The method of claim 18, wherein said degradation policy utilizes resource price related information.

* * * * *